(12) United States Patent
Swindler (10) Patent No.: US 6,588,288 B1
(45) Date of Patent: Jul. 8, 2003

(54) RESISTIVE ELEMENT STRUCTURE FOR A SENDER ASSEMBLY OF A GAUGE

(75) Inventor: Danny E. Swindler, Round Rock, TX (US)

(73) Assignee: Rochester Gauges, Inc., Dallas, TX (US)

( * ) Notice: Subject to any disclaimer, the term of this patent is extended or adjusted under 35 U.S.C. 154(b) by 132 days.

(21) Appl. No.: 09/665,626

(22) Filed: Sep. 19, 2000

(51) Int. Cl.[7] .............................................. H01C 10/16
(52) U.S. Cl. ..................... 73/866.1; 328/126; 328/127; 328/128
(58) Field of Search ........................ 73/866.1; 338/118, 338/126–195

(56) References Cited

U.S. PATENT DOCUMENTS

| 755,827 | A | * | 3/1904 | Yates et al. ................. 338/124 |
|---|---|---|---|---|
| 3,681,753 | A | | 8/1972 | Whalen et al. .......... 340/450.2 |
| 3,826,139 | A | | 7/1974 | Bachman ..................... 73/311 |
| 3,965,454 | A | * | 6/1976 | Puerner ...................... 338/171 |
| 4,102,191 | A | | 7/1978 | Harris .......................... 73/313 |
| 4,114,130 | A | | 9/1978 | Sutton et al. ................. 338/33 |
| 4,430,634 | A | | 2/1984 | Hufford et al. ............. 338/164 |
| 4,441,364 | A | | 4/1984 | Montie ........................ 73/313 |
| 4,575,929 | A | | 3/1986 | Bleeke ........................ 29/620 |
| 4,671,121 | A | | 6/1987 | Schieler ...................... 73/317 |
| 4,825,070 | A | | 4/1989 | Arimura ................ 250/231.18 |
| 4,924,704 | A | | 5/1990 | Gaston ........................ 73/317 |
| 4,931,764 | A | * | 6/1990 | Gaston ....................... 338/185 |
| 5,357,815 | A | | 10/1994 | Williamson ................ 73/866.3 |
| 5,672,818 | A | * | 9/1997 | Schaefer et al. .............. 73/116 |
| 5,743,136 | A | | 4/1998 | Gaston et al. ................ 73/313 |
| 5,746,088 | A | | 5/1998 | Sawert et al. ................ 73/317 |
| 5,959,525 | A | | 9/1999 | Black et al. ................ 338/198 |
| 5,963,124 | A | * | 10/1999 | Buss et al. .................. 338/118 |
| 5,998,892 | A | | 12/1999 | Smith et al. ................ 310/688 |
| 6,040,756 | A | | 3/2000 | Kaijala ....................... 338/160 |
| 6,127,916 | A | * | 10/2000 | Cooper et al. ............. 338/190 |

OTHER PUBLICATIONS

"Series 353 Sensor Brings New Accuracy to Fuel Gauges" website: http://www.ctscorp.com/techtalk/issue4/fuel-gauge.htm (2 pgs.).

* cited by examiner

Primary Examiner—Helen Kwok
Assistant Examiner—David Rogers
(74) Attorney, Agent, or Firm—Sidley Austin Brown & Wood LLP (57) ABSTRACT

A resistive element structure for a sender assembly of a gauge is provided. The resistive element structure comprises a first and second resistive element. A first set of contact elements are distributed along a first arc about a pivot point. Each contact element of the first set is electrically connected to the first resistive element. A second set of contact elements is distributed along a second arc about the pivot point. Each contact element of the second set is electrically connected to the second resistive element.

10 Claims, 11 Drawing Sheets

RESISTIVE ELEMENT STRUCTURE FOR A SENDER ASSEMBLY OF A GAUGE

TECHNICAL FIELD OF THE INVENTION

The present invention relates to a sender assembly for a gauge. In particular, the present invention relates to a resistive element structure for a sender assembly of a gauge.

BACKGROUND OF THE INVENTION

This invention relates to a gauge for measuring a liquid level. A common type of gauge is a float gauge that has a float that floats in the liquid being measured. Typically, the float is connected with other members of a sensor that move with the float as the liquid level changes. A common float gauge used for many years incorporates one variable resistor in the sensor to vary a resistance with a change in the liquid level. In such a sensor, a contact arm is moved along a resistive element as the float level changes. The resistance is measured between one end of the resistive element and the contact arm, which corresponds to the float position. The portion of the sensor incorporating the resistive element and the contact arm is commonly known as a sending unit or sender assembly.

U.S. Pat. No. 4,924,704 issued to Gaston discloses a fuel sender assembly having a float rod 22, a housing assembly 20 and 21, a resistor card 25, a carrier element 38, and a spring contact element 40. In particular, the resistor card 25 has one resistive film 55 disposed on a circuit card 54. One plurality of conductive strips 56 is laid down on the resistive film 55 to improve electrical contact between the resistive film and a spring contact end 41. The conductive strips 56 are elongated in a radial direction from a pivot point of a float portion 23. The conductive strips 56 have a variable width to provide gaps of constant size between each conductive strip 56, i.e., the sides of adjacent strips are parallel. Hence, the resistance between each conductive strip 56 is approximately the same.

U.S. Pat. No. 5,357,815 issued to Williamson discloses a gauge assembly 10 that uses a voltage divider circuit to provide a measurement of a fluid level within a tank or other environment. A pointer assembly 52 pivots about an axis 42 in response to a moving float 30 to indicate the fluid level. A plurality of contact arms 114, 116, 118 extending from a contact plate 58 on the pointer assembly 52 resiliently engage a point 120 along one resistive element 88. The first end of the resistive element 88 is connected to a voltage regulator 100, which is connected to a first wiper contact 94. The second end of the resistive element 88 forms a second wiper contact 96. The point 120 of contact between the contact arms 114, 116, 118, and the resistive element 88 is connected to an amplifier 102, which is connected to a third contact 95 to form a low impedance voltage divider.

U.S. Pat. No. 5,743,136 issued to Gaston, et al., discloses a fluid level sensor having one angular resistive element 110, and a float 24 coupled to one contact 44. The resistive element 110 is designed for use in conventional fuel level sensors having a float attached to an arm. The float 24 moves up and down with the fuel level, moving the contact 44 along a path 112. The resistive element 110 has a resistive layer and a conductive layer applied to an insulating substrate 111. The resistive layer includes a resistor material disposed in segments 114 disposed along the path 112. The segments 114 all contact a trim section 116. The conductive layer is disposed on top of the resistive layer. The conductive layer includes discrete pads 122, which are disposed coincidentally on the segments 114 of resistive material.

As disclosed in the prior art, there are many advantages to using a resistive element structure with discrete contact pads, such as providing discrete increments of resistance change as the float move with the liquid level. However, despite the widespread use, such prior art resistive element structures with discrete contact pads have a major disadvantage. By using only one resistive element and one row of discrete contact pads, the angular resolution of such prior art resistive elements is limited by the angular spacing between the discrete contact pads.

Therefore, a need exists for a resistive element of a gauge sensor that provides discrete increments of resistance change as a measuring member moves, as well as a high resolution of measurement.

The present invention has numerous advantages, such as providing higher angular resolution for a gauge in discrete increments as a measuring member moves. Another advantage is providing a substantially higher angular resolution in discrete increments without substantially increasing the size of the sender assembly to accommodate a longer wiper contact arm.

SUMMARY OF THE INVENTION

It is an object of the present invention to provide a resistive element structure for a gauge sensor that provides discrete increments of resistance change as a measuring member moves, while also providing a high angular resolution.

In accordance with one aspect of the present invention, a resistive element structure for a sender assembly of a gauge is provided. The resistive element structure comprises a first and second resistive element. A first set of contact elements is distributed along a first arc about a pivot point. Each contact element of the first set is electrically connected to the first resistive element. A second set of contact elements is distributed along a second arc about the pivot point. Each contact element of the second set is electrically connected to the second resistive element.

In accordance with another aspect of the present invention, a resistive element structure for a sender assembly of a gauge is provided. The resistive element structure comprises a first and second resistive element, each being formed on the structure. The first resistive element has a first elongated shape with a first longitudinal extent. A first plurality of contact elements is formed on a structure along a first arc at a first radial distance from a pivot point. A first set of leads extend from the first plurality of contact elements. Each lead of the first set of leads correspondingly connects each contact element of the first plurality of contact elements to the first resistive element. Each lead of the first set of leads connects to the first resistive element at a different location along the first longitudinal extent of the first resistive element. The second resistive element has a second elongated shape with a second longitudinal extent. A second plurality of contact elements is formed on the structure along a second arc at a second radial distance from the pivot point. A second set of leads extends from the second plurality of contact elements. Each lead of the second set of leads correspondingly connects each contact element of the second plurality of contact elements to the second resistive element. Each lead of the second set of leads connects to the second resistive element at a different location along the second longitudinal extent of the second resistive element.

In accordance with yet another aspect of the present invention, a gauge sensor is provided. The gauge sensor comprises a measuring member, a resistive element structure, and a contact carrier. The measuring member has a pivot portion, which is adapted to pivot about a pivot axis. The resistive element structure comprises a first resistive element, first plurality of contact elements, a first set of leads, a second resistive element, a second plurality of contact elements, and a second set of leads. The first resistive element is formed on the structure, is adapted to electrically connect to a gauge circuit, and has a first elongated shape with a first longitudinal extent. The first plurality of contact elements is formed on the structure along a first arc at a first radial distance from the pivot axis. Each lead of the first set of leads correspondingly connects each contact element of the first plurality of contact elements to the first resistive element. Each lead of the first set of leads connects to the first resistive element at a different location along the first longitudinal extent of the first resistive element. The second resistive element is formed on the structure, has a second elongated shape with a second longitudinal extent, and is adapted to electrically connect to the gauge circuit. The second plurality of contact elements is formed on the structure along a second arc at a second radial distance from the pivot axis. Each lead of the second set of leads correspondingly connects each contact element of the second plurality of contact elements to the second resistive element. Each lead of the second set of leads connects to the second resistive element at a different location along the second longitudinal extent of the second resistive element. The contact carrier is adapted to pivot about the pivot axis along with the pivot portion of the measuring member. The contact carrier has a first and second wiper contact. The first wiper contact is located at the first radial distance from the pivot axis, is adapted to electrically connect to at least one of the first plurality of contact elements as the measuring member pivots about the pivot axis, and is electrically connected to the gauge circuit. The second wiper contact is located at the second radial distance from the pivot axis, is adapted to electrically connect to at least one of the second plurality of contact elements as the measuring member pivots about the pivot axis, and is electrically connected to the gauge circuit.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Referring now to the drawings, wherein like reference numbers are used to designate like elements throughout the various views, several embodiments of the present invention are further described.

The present invention relates to a sender assembly for a gauge. A typical gauge for measuring a liquid level, for example, is a float gauge. The float gauge has a float that moves up and down with a liquid level. Often the float is attached to a float arm, which is pivotably connected to the sender assembly. One purpose of the sender assembly is to detect a movement and position of the float arm, and to translate such movement and position into an electrical signal corresponding to the liquid level. Such electrical signal is often provided to a gauge circuit, which processes the electrical signal and typically displays the liquid level measurement on a gauge display.

Figure 1:
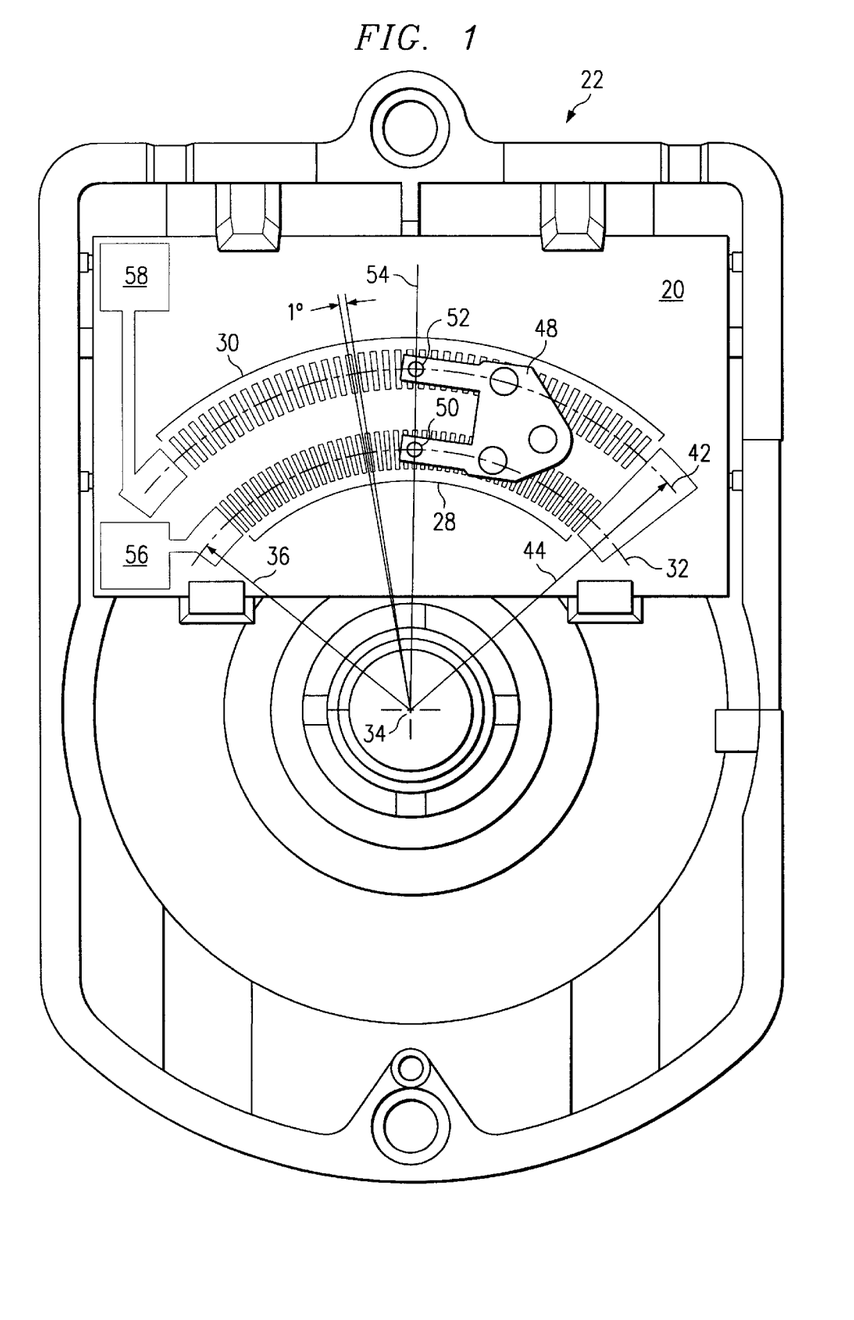
FIG. 1 is a top view of a sender assembly in accordance with a first embodiment of the present invention.
Figure 2:
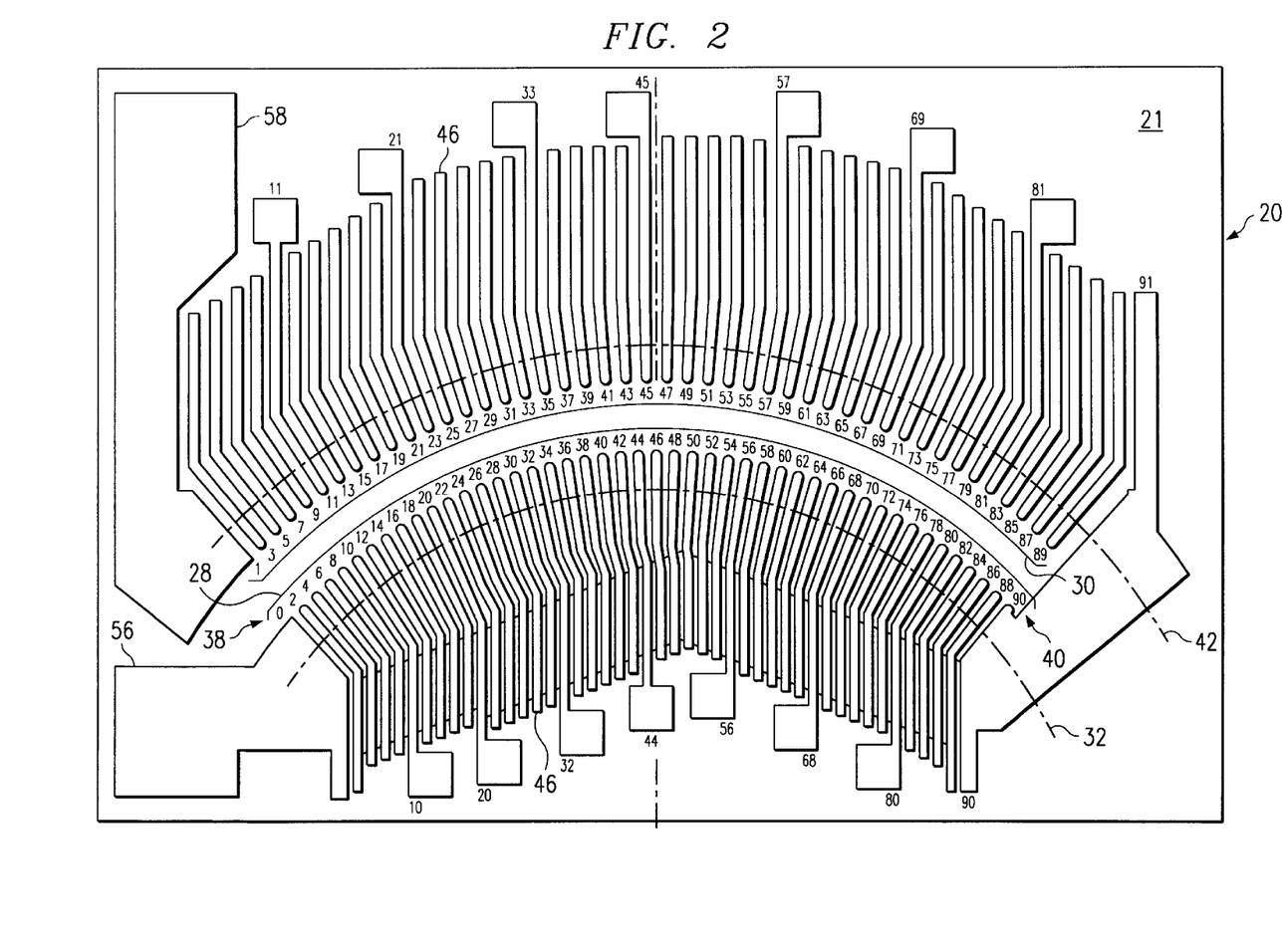
FIG. 2 is an enlarged top view of a resistive element structure of FIG. 1, without the resistive layer for illustration purposes.
Figure 3:
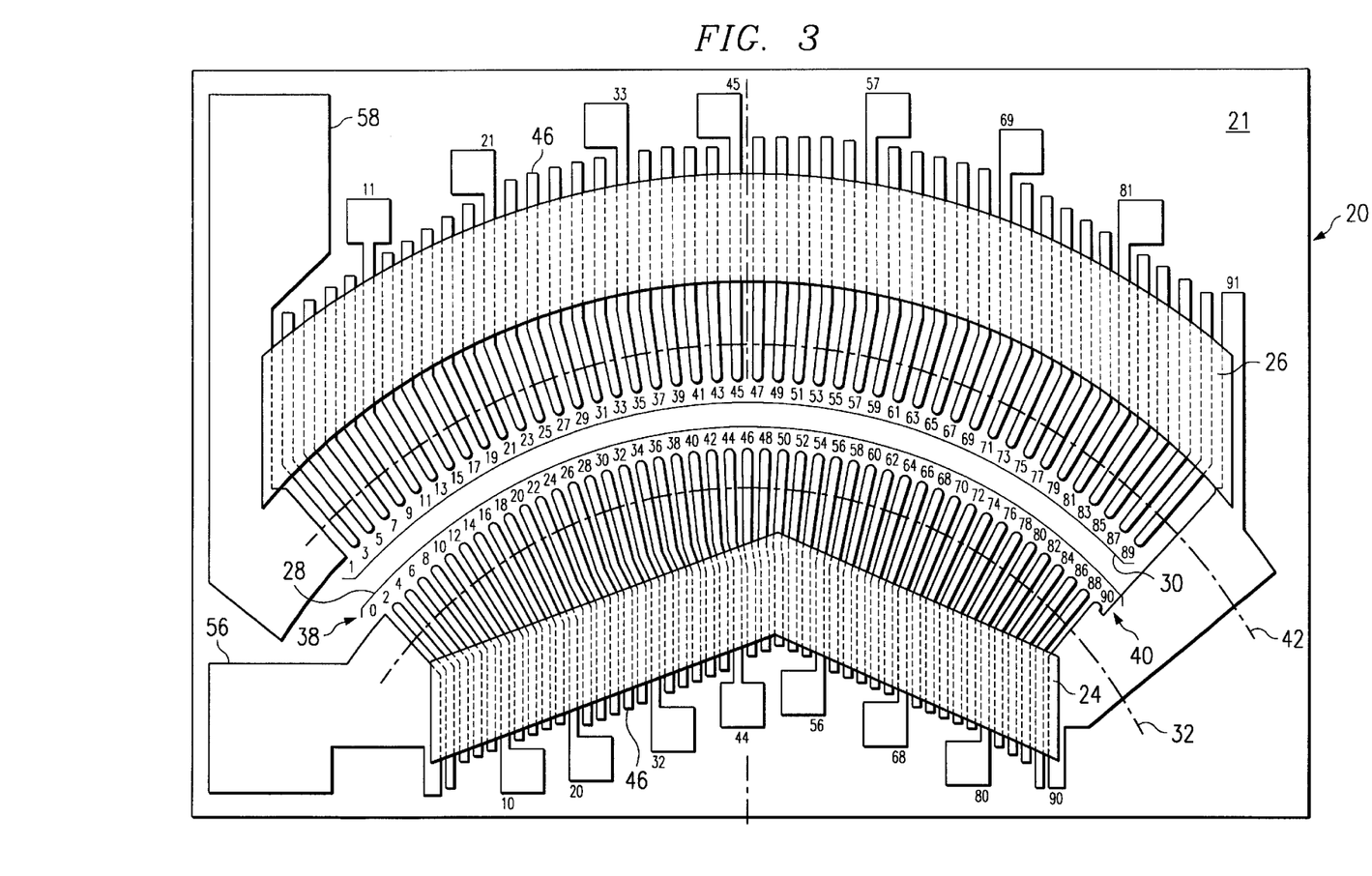
FIG. 3 is an enlarged top view of the resistive element structure of FIGS. 1 and 2.

FIGS. 1–3 show a resistive element structure 20 of a sender assembly 22 in accordance with a first embodiment of the present invention. The resistive element structure 20 has two resistive elements 24, 26 connected to two sets of contact elements, 28, 30, respectively. FIG. 1 shows the resistive element structure 20 mounted in the sender assembly 22. For illustration purposes, the resistive elements 24, 26 are not shown in FIGS. 1 and 2. The first set of contact elements 28 are distributed along a first arc 32 about a pivot point 34. The first arc 32 is located at a first radial distance 36 from the pivot point 34. The pivot point 34 coincides with a pivot axis for a measuring member. The measuring member (not shown) can be a known float arm having a pivotal portion, an extension, and a float.

Each contact element of the first set 28 can be distributed in predetermined increments along the first arc 32, and in particular, two degree increments have been found useful. For example, as shown in a preferred embodiment in FIG. 2, a contact element 38 of the first set 28 on the left side corresponds to zero degrees, and a contact element 40 of the first set 28 on the right side corresponds to ninety degrees. Each contact between zero and ninety degrees is located at increments between about one degree and about three degrees, but preferably at uniform increments of approximately two degrees, along the first arc 32. Similarly, the second set of contact elements 30 is distributed along a second arc 42 about the pivot point 34. The second arc 42 is located at a second radial distance 44 from the pivot point 34. Each contact element of the second set 30 can be distributed along the second arc 42 at predetermined increments, and in particular, uniform increments of approximately two degrees have been found useful. For example, as also shown in FIG. 2, the contact elements of the second set 30 range from one degree to eighty-nine degrees. Hence, the contact elements of the first set 28 are offset from the contact elements of the second set 30 by about one degree. However, other increments and other offsets can be used.

Each contact element has a lead 46 extending from it. The leads 46 connect the contact elements 28, 30 to the resistive elements 24, 26, respectively. The leads are not shown in FIG. 1 for illustrative purposes. The leads 46 and the contact elements 28, 30 are printed on the structure 20 together (see FIG. 2). The leads 46 and contact elements 28, 30 can be made from a low resistance metal, such as a lead-silver combination. The structure board 21 can be made of a ceramic, insulating substrate material, such as alumina. The resistive elements 24, 26 are then printed on top of the leads 46, as shown in FIG. 3. The leads 46 are preferably evenly spaced apart to provide the same resistance between each lead, and thus the same resistance between each contact element.

Referring to FIG. 1, a contact carrier 48 is positioned above the first and second set of contact elements 28, 30. The contact carrier 48 attaches at the pivot point 34 with a contact arm (not shown) so that it pivots about the pivot point as the measuring member (not shown) pivots about the pivot point. The contact carrier 48 has a first wiper contact 50 located at the first radial distance 36, and thus the first wiper contact 50 travels along the first arc 32. The contact carrier 48 also has second wiper contact 52 located at the second radial distance 44, and the second wiper contact 52 travels along the second arc 42. The first wiper contact 50 is angularly aligned with the second wiper contact 52, as shown by the radially extending line 54 in FIG. 1. The first and second wiper contacts 50, 52 are biased by the contact carrier 48 against the structure 20 so that each wiper contact maintains an electrical connection with a corresponding contact element below each wiper contact. The wiper contacts are adapted to electrically connect in parallel fixed resistors to a gauge circuit (not shown). Preferably, the contact carrier 48 which connects the first and second wiper contacts 50, 52 to each other is an electrically conductive spring type device.

Referring again to FIG. 3, in the preferred embodiment the first resistive element 24 is electrically connected to a first terminal 56 on the structure 20. Likewise, the second resistive element 26 is electrically connected to a second terminal 58 on the structure 20. The first and second terminals 56, 58 are solder pads so that the structure 20 can be connected to the gauge circuit (not shown). When installed in an operable sender assembly, the structure 20 combined with the contacts 50, 52 form a circuit with the gauge circuit, in which the first and second resistive elements 24, 26 are connected in parallel. The material of the resistive elements 24, 26 is chosen so that the resistive elements have a substantially constant resistance value per length along a longitudinal extent of each resistive element. The resistive elements 24, 26 can be made from any known resistive materials, such as a metal glass matrix. Because the spacing between each lead 46 is approximately the same along the longitudinal extent of each resistive element 24, 26 (see FIG. 3), an effective resistor is formed between each lead having approximately the same resistance value (e.g., approximately one ohm between each lead). However, the spacing between the leads 46 and the resistance properties of the resistive elements 24, 26 can vary.

FIGS. 4A–4F show a schematic representation of the circuit formed with the resistive element structure 20 from the first embodiment, the first and second wiper contacts 50, 52, and a gauge circuit 60. Also, FIGS. 4A–4F illustrate how the resistance in the preferred embodiment varies in discrete increments of approximately one degree to provide about a one degree resolution.

Figure 4A:
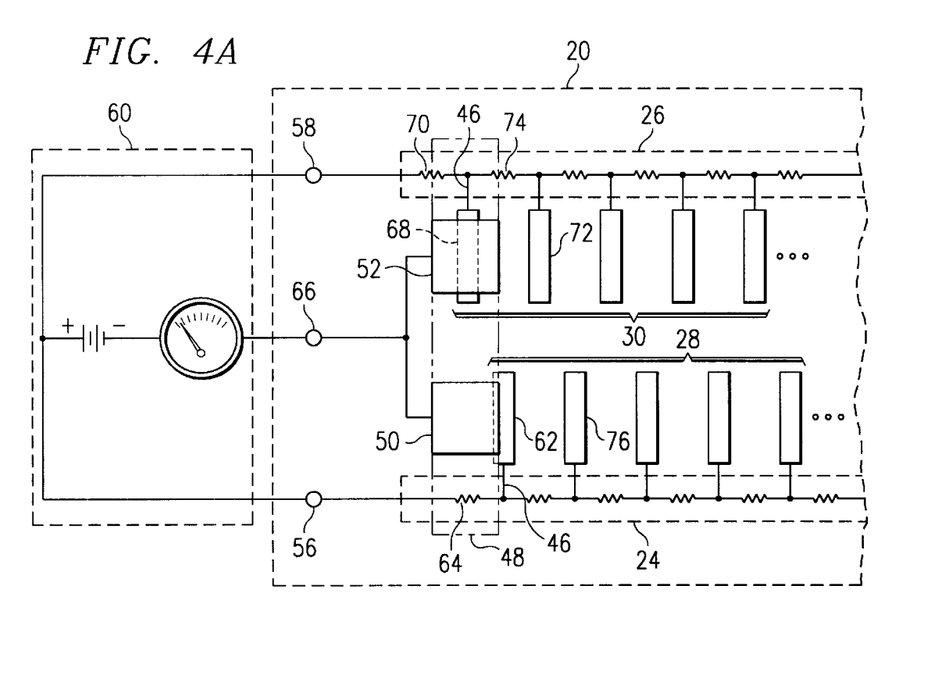
FIGS. 4A–4F are schematic representations of a circuit formed by the resistive element structure of FIGS. 1–3.

In FIG. 4A, the first wiper contact 50 is above, and thus electrically connected to a first contact element 62 in the first set of contact elements 28. Hence, the current from the gauge circuit 60 will flow to the first terminal 56, through the first effective resistor 64 of the first resistive element 24, to a lead 46 extending from the first contact element 62 of the first set of contact elements 28, to the first contact element 62 of the first set of contact elements 28, to the first wiper contact 50, and then to the ground terminal 66, which is connected to the gauge circuit 60. Similarly, the second wiper contact 52 is above and electrically connected to a first contact element 68 of the second set of contact elements 30. Thus, the current from the gauge circuit 60 will also flow to the second terminal 58, through the first effective resistor 70 of the second resistive element 26, to a lead 46 extending from the first contact element 68 of the second set of contact elements 30, to the first contact element 68 of the second set of contact elements 30, to the second wiper contact 52, and then to the ground terminal 66. Therefore, the first resistive element 24 is in parallel with the second resistive element 26. Assuming for this example, in FIGS. 4A–4F the effective resistor between each lead has about 1 ohm resistance, the total equivalent resistance through the structure 20 in FIG. 4A is about 0.5 ohms because the first and second resistive elements are in parallel. Also, for this example, the position of the first and second wiper contacts 50, 52 in FIG. 4A is at about one degree.

Figure 4B:
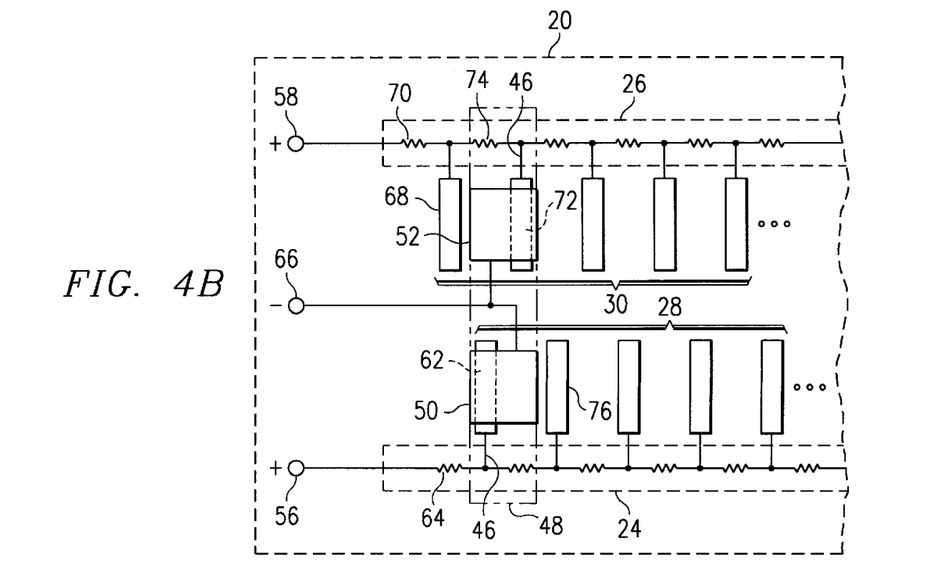

In FIGS. 4A–4F, the first set of contact elements 28 are angularly offset from the second set of contact elements 30 by about one degree, as in FIGS. 1–3. In FIG. 4B, the first wiper contact 50 is still above and electrically connected to the first contact element 62 of the first set of contact elements 28, and the current path through the first wiper contact 50 will be the same as that described above regarding FIG. 4A. But, the second wiper contact 52 is above and electrically connected to a second contact element 72 of the second set of contact elements 30. Hence, the current from the gauge circuit 60 will flow from the second terminal 58, through the first effective resistor 70 and a second effective resistor 74 of the second resistive element 26, to a lead 46 extending from the second contact element 72 of the second set of contact elements 30, to the second contact element 72 of the second set of contact elements 30, to the second wiper contact 52, and then to the ground terminal 66. Thus when the contacts 50, 52 move to the 2 degree position, the second wiper contact 52 begins to touch the second contact element 72 of the second set of contact elements 30, and the total equivalent resistance through the structure changes to about 0.7 ohms.

Figure 4C:
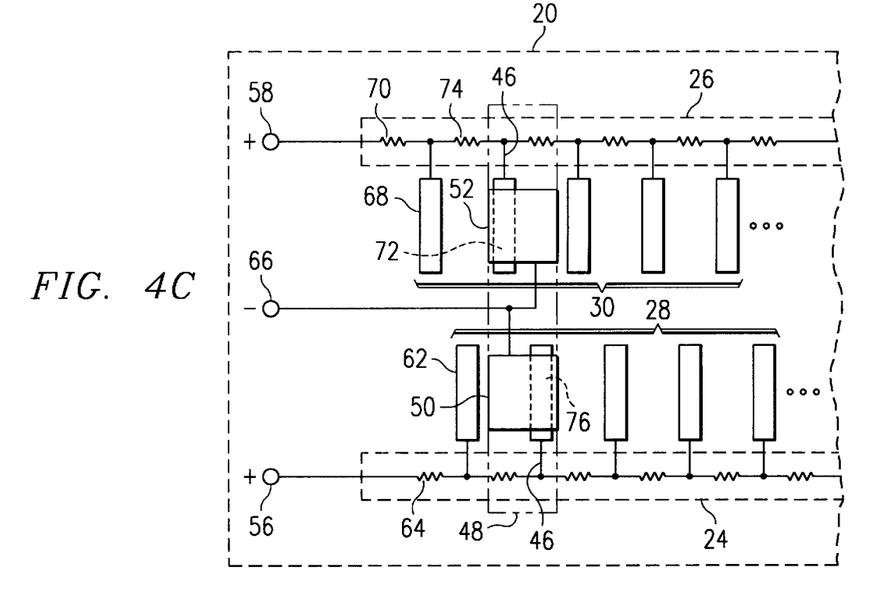
Figure 4D:
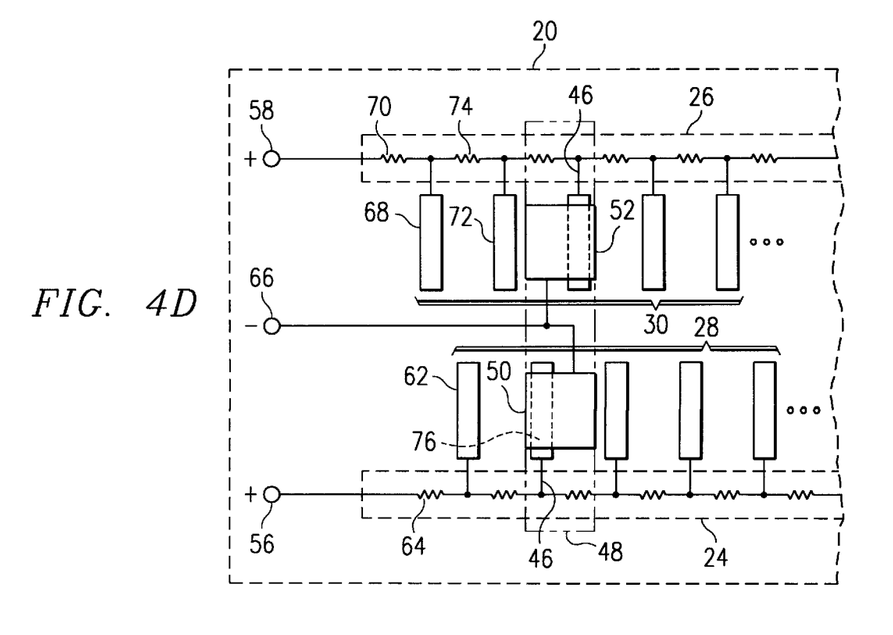
Figure 4E:
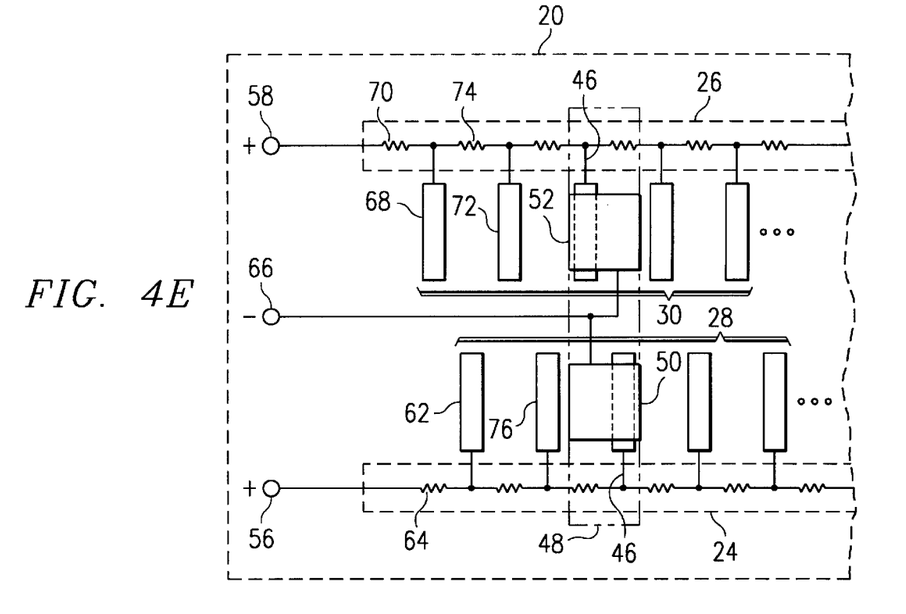
Figure 4F:
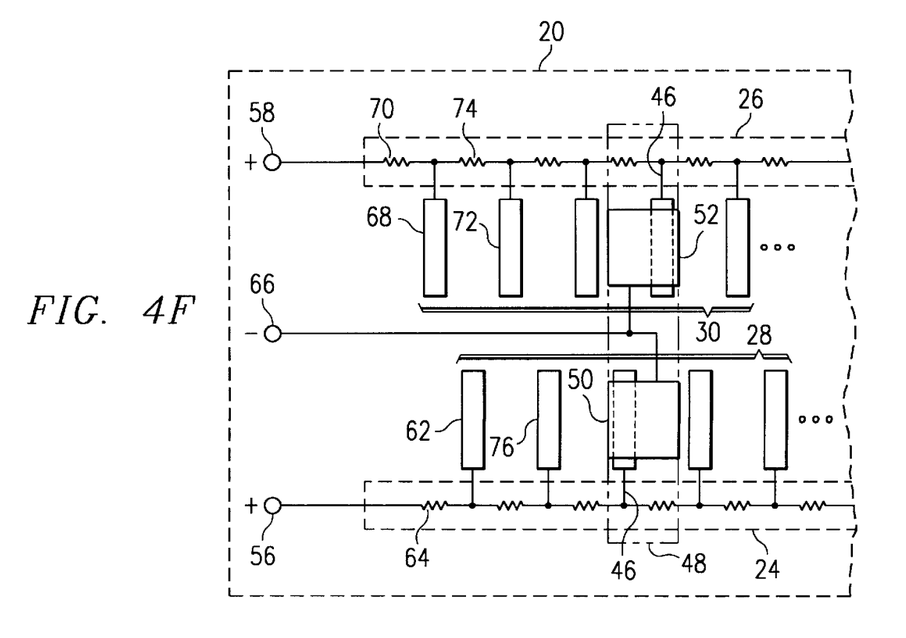

Continuing with the same example structure schematic in FIG. 4C, at about 3 degrees, the first wiper contact 50 is now above a second contact element 76 of the first set of contact elements 28. Thus, as the contact carrier 48 (shown in phantom lines) moves about one degree to the right, another contact element 76 is engaged and the total effective resistance is increased. Hence, the resistance increases in discrete steps for every one degree increase of angular movement for the contact carrier 48. Accordingly, the total effective resistance in FIG. 4C, across both resistive elements 24, 26 in parallel, is about 1.0 ohm for the position of about 3 degrees. In FIG. 4D, the total effective resistance is about 1.2 ohms for the position of about 4 degrees. In FIG. 4E, the total effective resistance is about 1.5 ohms for the position of about 5 degrees, and in FIG. 4F, the total effective resistance is about 1.7 ohms for the position of about 6 degrees. Therefore, although the contact elements along each arc provide only a two degree angular resolution, the combination of the first and second sets of contact elements 28, 30 provide about a one degree angular resolution. Thus, the accuracy of the gauge is improved over a single resistive element.

Figure 5:
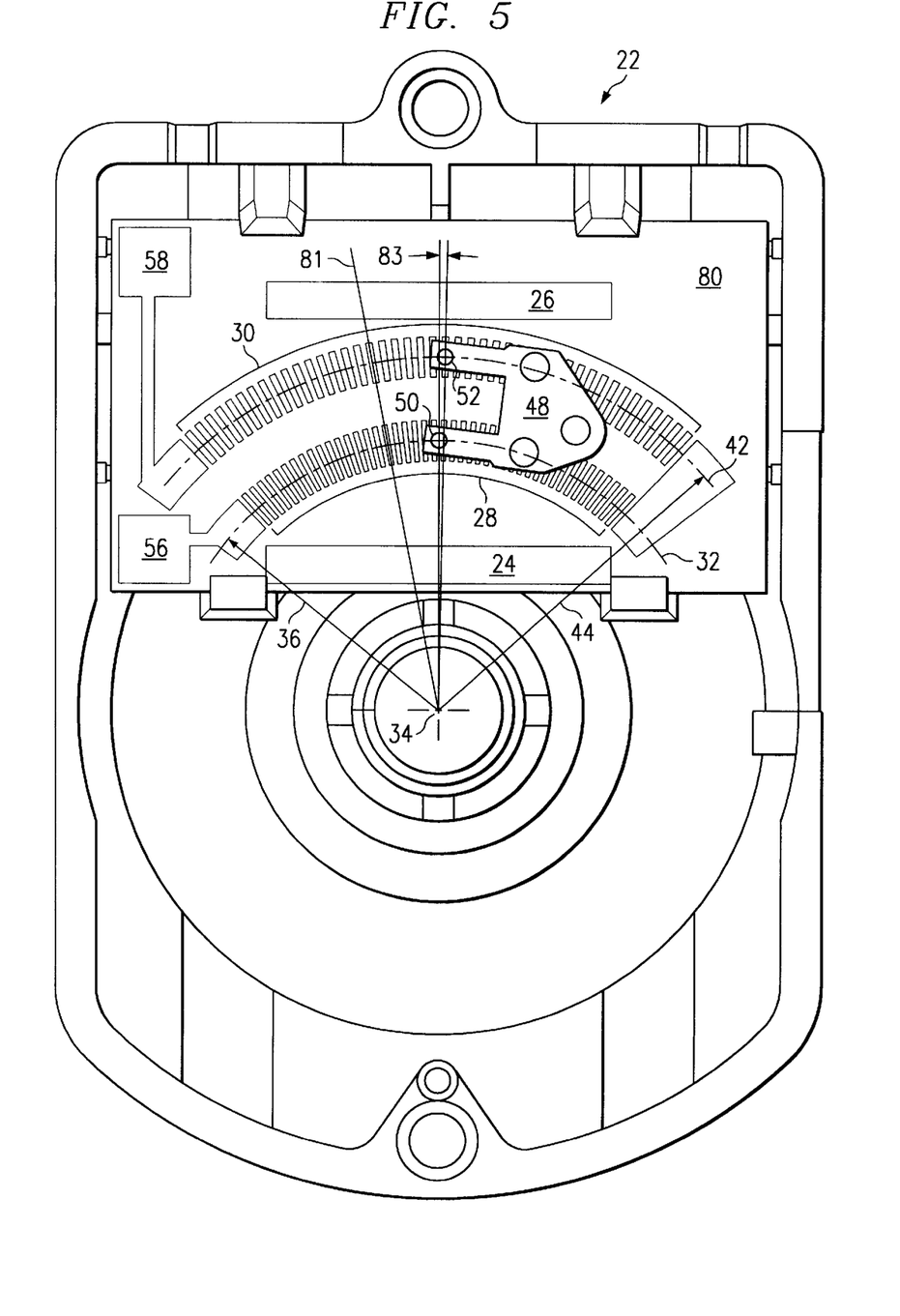
FIG. 5 is a top view of a sender assembly in accordance with a second embodiment of the present invention.
Figure 6A:
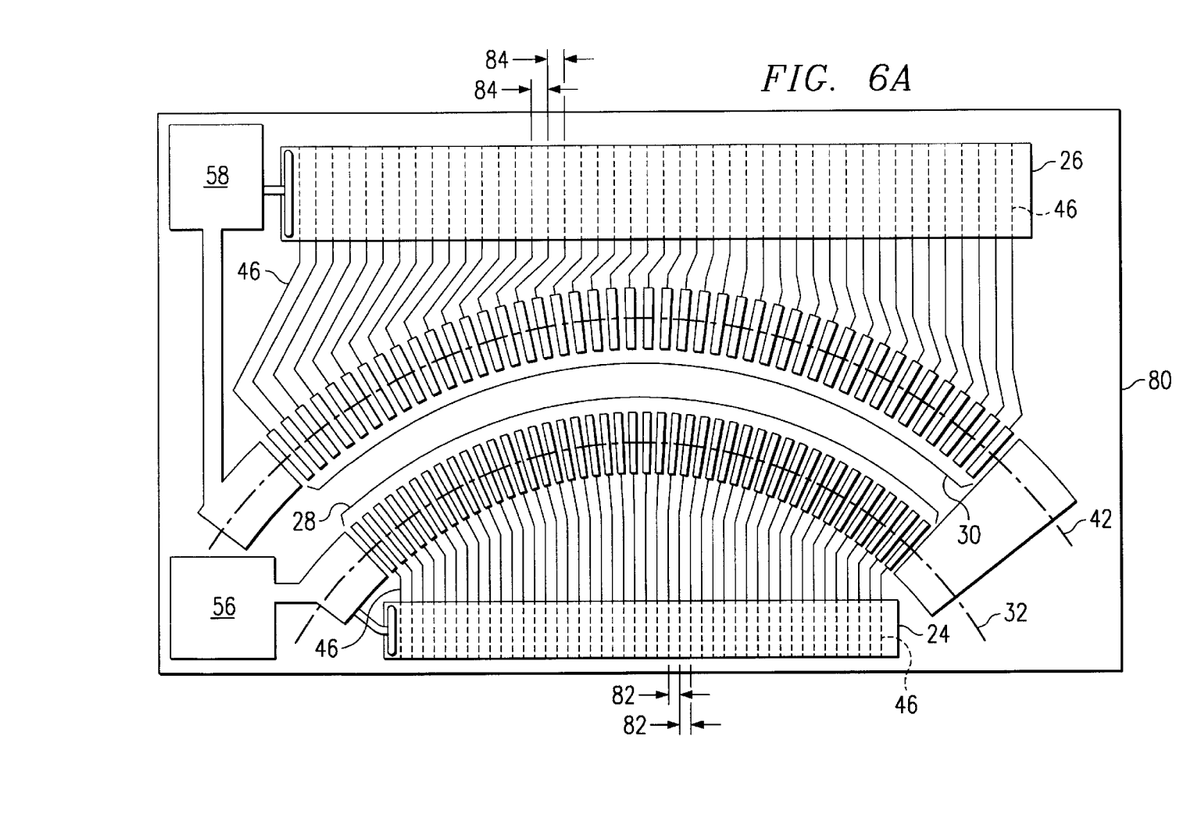
FIG. 6A is an enlarged top view of a resistive element structure of FIG. 4.
Figure 6B:
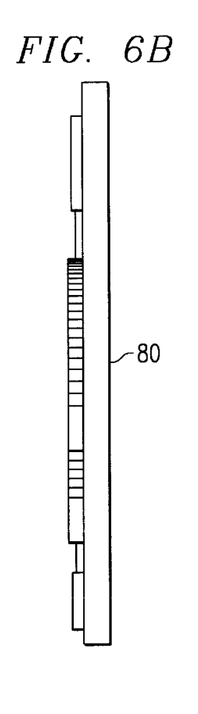
FIG. 6B is an enlarged side view of the resistive element structure of FIG. 5A.

FIGS. 5–6B show a resistive element structure 80 (in a sender assembly 22) in accordance with a second embodiment of the present invention. The leads 46 are not shown in FIG. 5 for illustration purposes. The second embodiment still incorporates the concept of having two sets of contact elements 28, 30 along two arcs 32, 42 that are connected to two separate resistive elements 24, 26, respectively. However, in the second embodiment, each contact element in the first set of contact elements 28 is angularly aligned with each contact element in the second set of contact elements 30, as shown by the radially extending line 81. Instead of the contact elements 28, 30 being offset by about one degree, the contacts 50, 52 on the contact carrier 48 are offset by about one degree (see reference number 83). Hence, when the first wiper contact 50 is at 25 degrees, the second wiper contact 52 will at 26 degrees. The contact elements 28, 30 are distributed in two-degree increments along each arc 32, 42, respectively. But because the contacts 50, 52 on the contact carrier 48 are offset by one degree, the first and second sets of contact elements 28, 30 combine to provide about a one degree resolution. Therefore, the second embodiment provides the identical functions and results as the first embodiment but with a reverse positioning of the offset.

As shown best in FIG. 6A, the resistance elements 24, 26 in the second embodiment are printed in different locations than the resistive elements 24, 26 in the first embodiment (see FIG. 3). In FIG. 6A, each resistive element 24, 26 is formed in an elongated rectangular configuration. Again, the leads 46 are each evenly spaced from each other, as illustrated at reference numbers 82 and 84. Also, the longitudinal extent of each resistive element 24, 26 is perpendicular to the longitudinal extent of each lead 46. One advantage of printing each resistive element 24, 26 with a uniform width along a straight longitudinal extent that is perpendicular to the leads 46, is that it is easier to design and manufacture a structure with approximately the same resistance between each lead, and hence the same resistance between each contact element. Also, the different placement of the resistive elements 24, 26 in the second embodiment, compared to the first embodiment, illustrates that the actual placement and shape of the resistive elements can vary.

FIG. 6B shows a side view of the structure 80 shown in FIG. 6A, which illustrates that the structure in the second embodiment can be quite thin. With the use of known manufacturing processes, the actual size of the structure 80 shown in FIG. 6A can be about one inch long and one-half inch high. As manufacturing techniques improve, it will likely be possible to make structures even smaller, and it will also be likely that the size and angular spacing of the contact elements can be decreased as well to increase resolution further.

Figure 7:
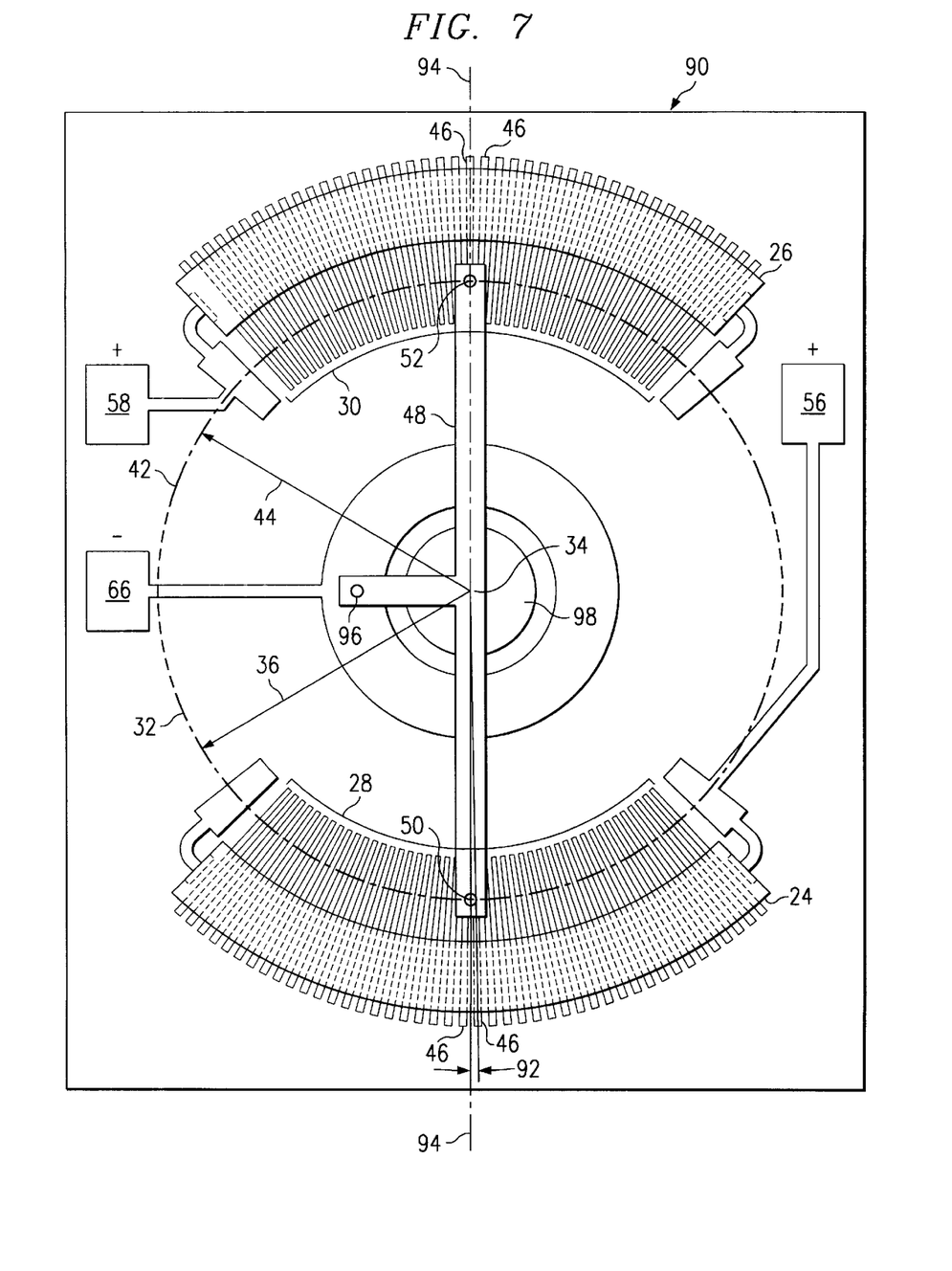
FIG. 7 is an enlarged top view of a resistive element structure for a sender assembly in accordance with a third embodiment of the present invention.
Figure 8:
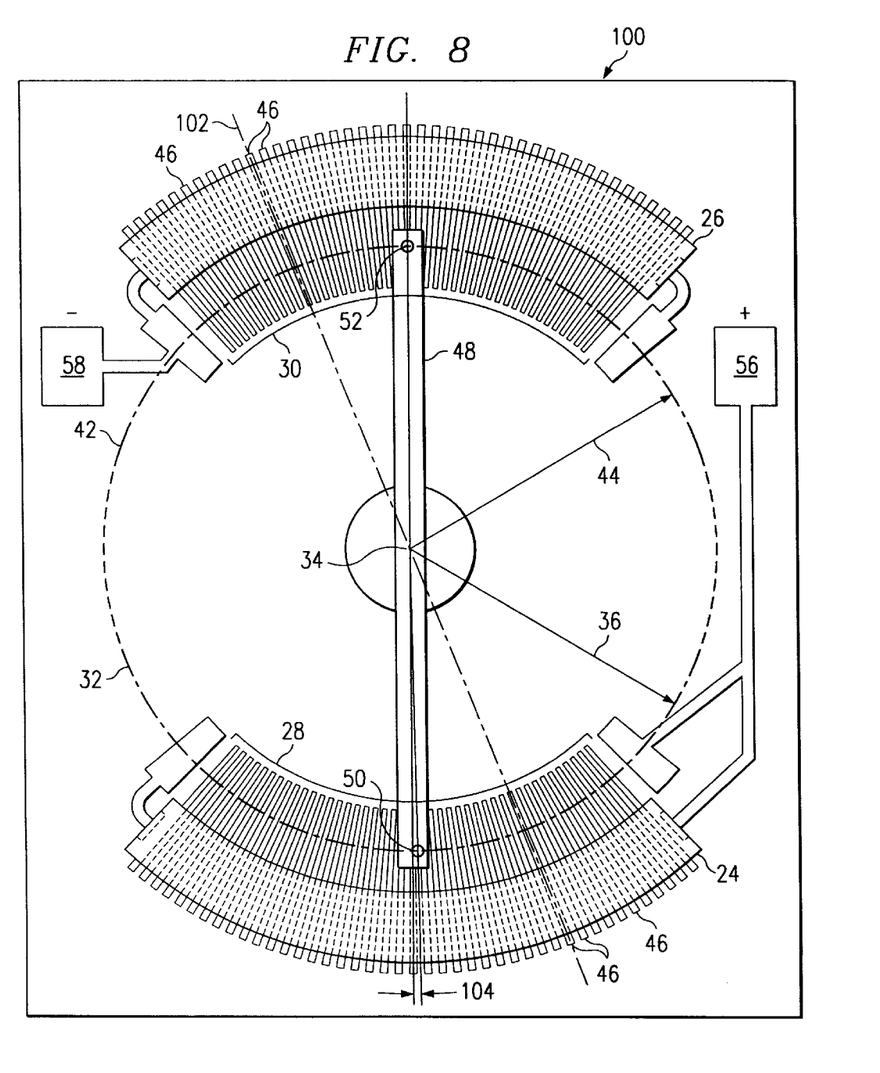
FIG. 8 is an enlarged top view of a resistive element structure for a sender assembly in accordance with a fourth embodiment of the present invention.

In the first and second embodiments described above, the first arc 32 and the second arc 42 were at different radial distances 36, 44 from the pivot point 34. However, in yet another embodiment of the present invention the first arc 32 and second arc 42 can be at the same radial distance from the pivot point 34. FIGS. 7 and 8 illustrate such an embodiment. These arcs in FIGS. 7 and 8 could also be placed at different radial distances if desired.

FIG. 7 shows a resistive element structure 90 in accordance with a third embodiment of the present invention. The first set of contact elements 28 are distributed along a first arc 32 at a first radial distance 36 from the pivot point 34. The second set of contact elements 30 are distributed along a second arc 42 at a second radial distance 44 from the pivot point 34. The first radial distance 36 is substantially equivalent to the second radial distance 44. This is accomplished by having the first set of contact elements 28 at an upper portion of the structure 90, and having the second set of contact elements 30 at a lower portion of the structure. As in the previously described embodiments, the contact elements 28, 30 are preferably distributed in about two degree increments along each arc 32, 42, respectively. The contact elements of the first set 28 are angularly offset by about one degree from the contact elements of the second set 30, as indicated by reference number 92. However, the first wiper contact 50 is angularly aligned with the second wiper contact 52, as indicated by reference number 94. Thus, as in the first embodiment, the third embodiment provides about a one degree angular resolution about the pivot point 34.

The third embodiment of FIG. 7 has a third contact 96 on the contact carrier 48. The third contact 96 electrically connects to the ground terminal 66. The third contact 96 is electrically connected to the first and second wiper contacts 50, 52. Also, the pivot portion 98 of a measuring member is shown in FIG. 7. The pivot portion 98 pivots about the pivot point 34 about a pivot axis extending through the pivot point 34. In the third embodiment of FIG. 7, the pivot portion 98 of the measuring member is directly connected to the contact carrier 48. However, as is known in the art, there are various ways to link the contact carrier 48 to pivot portion 98, any of which can be incorporated with an embodiment of the present invention.

FIG. 8 shows a resistive element structure 100 in accordance with a fourth embodiment of the present invention. As in the third embodiment, the first and second sets of contact elements 28, 30 are distributed in about two degree increments along each arc 32, 42, respectively, at the same radial distance from the pivot point 34. However, the contact elements of the first set 28 are substantially angularly aligned with the contact elements of the second set 30, as indicated by reference number 102. The first wiper contact 50 is angularly offset from the second wiper contact 52 by about one degree, as indicated by reference number 104. Thus, as in the second embodiment, the fourth embodiment provides about a one degree angular resolution about the pivot point 34.

However, the fourth embodiment shown in FIG. 8 differs from the previously described embodiments in that the, resistive elements 24, 26 are connected in series rather than in parallel. The first wiper contact 50 is electrically connected to the second wiper contact 52, but neither contacts 50, 52 are directly connected to the gauge circuit 60. Instead, the contacts 50, 52 are only electrically connected to each other and the resistive elements 24, 26. Therefore, the resistive elements 24, 26 can be connected to the gauge circuit 60 in parallel or in series.

Figure 9:
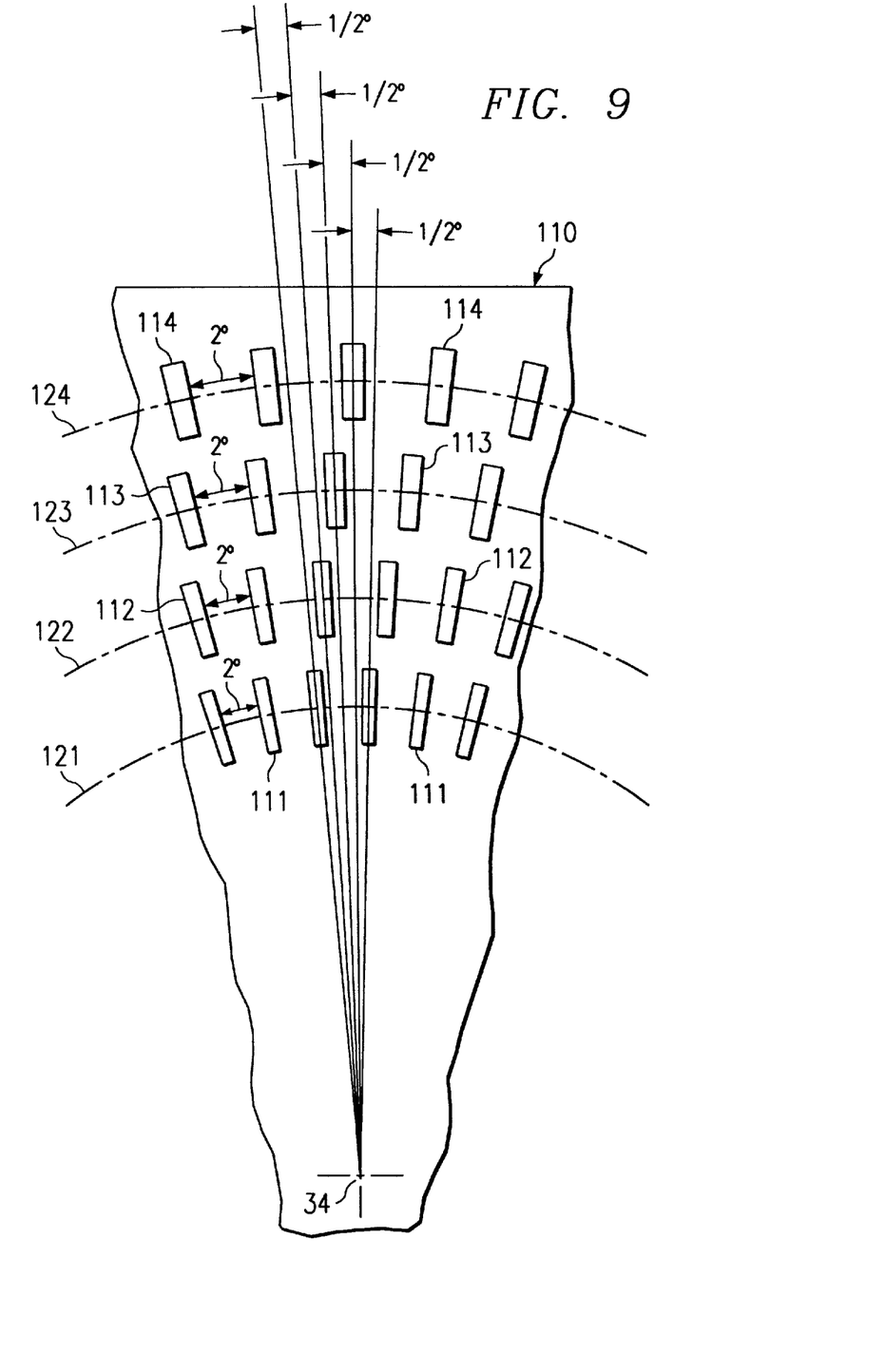
FIG. 9 is an enlarged top view of a resistive element structure for a sender assembly in accordance with a fifth embodiment of the present invention, with portions broken away for illustration.

FIG. 9 shows a portion of a resistive element structure 110 in accordance with a fifth embodiment of the present invention. In the fifth embodiment, there are four sets of contact elements 111, 112, 113, 114. The contact elements 111, 112, 113, 114 are distributed in about two degree increments along each arc 121, 122, 123, 124, respectively. The contact elements of the second set 112 are angularly offset by about 0.5 degree from the contact elements of the first set 111. The contact elements of the third set 113 are angularly offset by about 0.5 degree from the contact elements of the second set 112, and angularly offset by about one degree from the contact elements of the first set 111. The contact elements of the fourth set 114 are angularly offset by about 0.5 degree from the contact elements of the third set 113. Also, the contact elements of the fourth set 114 are angularly offset by about one degree from the contact elements of the second set 112, and angularly offset by about 1.5 degrees from the contact elements of the first set 111. The first, second, third, and fourth wiper contacts of the contact carrier (not shown) are all angularly aligned with each other. Therefore, the fifth embodiment provides about a one-half degree angular resolution about the pivot point 34.

As illustrated by the above described embodiments, the angular resolution of a resistive element structure can be increased by having multiple rows or sets of contact elements and multiple contacts on the contact carrier, while still providing angular measurements in discrete increments. Furthermore, as shown in FIGS. 1, 5, and 8, when the contacts 50, 52 are angularly offset, or when a first set of contact elements 28 is angularly offset from a second set of contact elements 30, such angular offset could be any odd number of degrees to provide the same function and result as a one degree offset. As will be appreciated, the resolution depends on the space between the contacts. Currently, there are practical limits as to how close the contacts can be discretely deposited. The resolution can be improved by making the radial distance from a wiper contact to the pivot point longer. While the space between the contact elements remains constant and the radial distance increases, the degree of angular displacement between the contact elements decreases. Longer radial distances, however, enlarge the size of the sender assembly, whereas the use of two or more resistive elements according to the present invention allows the sender assembly to be minimized without affecting resolution. The fifth embodiment illustrates that the number of rows or sets of contact elements can be greater than two, and the angular offset between the contact elements of each set can vary. Also, the angular distribution of the contact elements along each arc need not be in two degree increments because the space between the contact elements can vary, especially as manufacturing techniques improve.

It will be appreciated by those skilled in the art having the benefit of this disclosure that this invention provides a resistive element structure for a sender assembly of a gauge. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A resistive element structure for a sender assembly of a gauge, said structure comprising:
    a first resistive element formed on said structure, and having a first elongated shape with a first longitudinal extent;
    a first plurality of contact elements formed on said structure along a first arc at a first radial distance from a pivot point;
    a first set of leads, each lead of said first set of leads correspondingly connecting each contact element of said first plurality of contact elements to said first resistive element, such that each lead of said first set of leads connects to said first resistive element at a different location along said first longitudinal extent of said first resistive element;
    a second resistive element formed on said structure, and having a second elongated shape with a second longitudinal extent;
    a second plurality of contact elements formed on said structure along a second arc at a second radial distance from said pivot point wherein said first radial distance and a second radial distance are different;
    a second set of leads, each lead of said second set of leads correspondingly connecting each contact element of said second plurality of contact elements to said second resistive element, such that each lead of said second set of leads connects to said second resistive element at a different location along said second longitudinal extent of said second resistive element;
    a wiper having a first and second contact adapted to make electrical contact with one of said first plurality of contact elements and one of said second of second plurality of contact elements as the wiper moves over said first and second plurality of contact leads
    wherein a center of each contact element of said first plurality of contact elements is located at a different angular orientation about said pivot point than a center of each contact element of said second plurality of contact elements to provide a resistive element with greater resolution; and
    wherein said first resistive element and said second resistive element are connected in a parallel manner by making an electric connection between one of said first plurality of contact elements and one of said second plurality of contact elements to provide a resistive element with increased resolution.

2. A resistive element structure according to claim 1, wherein (i) said first plurality of contact elements is distributed along said first arc such that said center of each contact element of said first plurality of contact elements is approximately two degrees from said center of an adjacent contact element of said first plurality of contact elements, and (ii) said second plurality of contact elements is distributed along said second arc such that said center of each contact element of said second plurality of contact elements is approximately two degrees from said center of an adjacent contact element of said second plurality of contact elements, such that said first plurality of contact elements and said second plurality of contact elements combine to provide approximately a one degree resolution about said pivot point.

3. A resistive element structure according to claim 1, wherein (i) said first plurality of contact elements is distributed along said first arc such that said center of each contact element of said first plurality of contact elements is about one to about three decrees from said center of an adjacent contact element of said first plurality of contact elements, and (ii) said second plurality of contact elements is distributed alone said second arc such that said center of each contact element of said second plurality of contact elements is about one to three degrees from said center of an adjacent contact element of said second plurality of contact elements, such that said first plurality of contact elements and said second plurality of contact elements combine to provide about 0.5 to about 1.5 degrees of resolution about said pivot point.

4. A resistive element structure for a sender assembly of a gauge, said structure comprising:
    a first resistive element formed on said structure, and having a first elongated shape with a first longitudinal extent;

a first plurality of contact elements formed on said structure along a first arc at a first radial distance from a pivot point;

a first set of leads, each lead of said first set of leads correspondingly connecting each contact element of said first plurality of contact elements to said first resistive element, such that each lead of said first set of leads connects to said first resistive element at a different location along said first longitudinal extent of said first resistive element;

a second resistive element formed on said structure, and having a second elongated shape with a second longitudinal extent;

a second plurality of contact elements formed on said structure along a second arc at a second radial distance from said pivot point; and a second set of leads, each lead of said second set of leads correspondingly connecting each contact element of said second plurality of contact elements to said second resistive element, such that each lead of said second set of leads connects to said second resistive element;

a contact carrier adapted to pivot about said pivot point alone with said pivot point;

a first wiper contact on said contact carrier, said first wiper contact being (i) located at said first radial distance from said pivot point, (ii) adapted to electrically connect to at least one of said first plurality of contact elements as said measuring member pivots about said pivot point, and (iii) electrically connected to a second wiper contact;

a second wiper contact on said contact carrier, said second wiper contact being (i) located at said second radial distance from said pivot point, (ii) adapted to electrically connect to at least one of said second plurality of contact elements as said measuring member pivots about said pivot point, and (iii) electrically connected to said first wiper contact;

wherein said first wiper contact and said second wiper contact are mounted on said contact carrier such that when said second wiper contact is in contact with one of said second plurality of contact elements that said first wiper contact is capable of contacting no more than two of said first plurality of contact elements; and wherein an electric circuit is formed which includes said first resistive element, one of said first plurality of contact elements in contact with said first wiper contact, said second wiper contact; one of said second plurality of second contact elements to provide a resistance circuit with increased resolution.

5. A resistive element structure according to claim 4, wherein a center of each contact element of said first set of leads is located at a different annular orientation about said pivot point.

6. A resistive element structure according to claim 5, wherein a center of each contact element of said second set of leads is located at a different angular orientation about said pivot point.

7. A resistive element structure according to claim 4, wherein said first radial distance and said second radial distance are different.

8. A resistive element structure according to claim 4, wherein a center of each contact element of said first plurality of contact elements is located at a different angular orientation about said pivot point than a center of each contact element of said second plurality of contact elements.

9. A resistive element structure according to claim 4, wherein (i) said first plurality of contact elements is distributed along said first arc such that said center of each contact element of said first plurality of contact elements is about one to about three degrees from a center of an adjacent contact element of said first plurality of contact elements, and (ii) said second plurality of contact elements is distributed along said second arc such that said center of each contact element of said second plurality of contact elements is about one to three degrees from a center of an adjacent contact element of said second plurality of contact elements, such that said first plurality of contact elements and said second plurality of contact elements combine to provide about 0.5 to about 1.5 degrees of resolution about said pivot point.

10. A resistive element structure according to claim 9, wherein (i) said first plurality of contact elements is distributed along said first arc such that said center of each contact element of said first plurality of contact elements is approximately two degrees from said center of the adjacent contact element of said first plurality of contact elements, and (ii) said second plurality of contact elements is distributed along said second arc such that said center of each contact element of said second plurality of contact elements is approximately two degrees from said center of the adjacent contact element of said second plurality of contact elements, such that said first plurality of contact elements and said second plurality of contact elements combine to provide approximately a one degree resolution about said pivot point.

* * * * *

UNITED STATES PATENT AND TRADEMARK OFFICE
CERTIFICATE OF CORRECTION

PATENT NO.    : 6,588,288 B1
DATED         : July 8, 2003
INVENTOR(S)   : Danny E. Swindler

It is certified that error appears in the above-identified patent and that said Letters Patent is hereby corrected as shown below:

<u>Column 10,</u>
Line 52, delete "decrees" and insert -- degrees --.
Line 55, delete "alone", and insert -- along --.

<u>Column 11,</u>
Line 24, delete "alone", and insert -- along --.

Signed and Sealed this

Fourth Day of May, 2004

JON W. DUDAS
*Acting Director of the United States Patent and Trademark Office*